United States Patent
Brainos, II et al.

(10) Patent No.: US 7,237,182 B1
(45) Date of Patent: Jun. 26, 2007

(54) SYSTEM AND METHOD FOR SELECTIVELY RECOVERING FRAMES IN A COMMUNICATIONS ENVIRONMENT

(75) Inventors: Alain Charles Brainos, II, Creedmoor, NC (US); Dennis N. Blankenship, Holly Springs, NC (US); John S. Morris, Raleigh, NC (US); Walter L. Robinson, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 584 days.

(21) Appl. No.: 10/735,383

(22) Filed: Dec. 12, 2003

(51) Int. Cl.
*H03M 3/00* (2006.01)

(52) U.S. Cl. .................. 714/781; 714/758

(58) Field of Classification Search ............ 714/781, 714/758; 370/412, 252, 396
See application file for complete search history.

(56) References Cited

U.S. PATENT DOCUMENTS

| | | | |
|---|---|---|---|
| 4,539,684 A | 9/1985 | Kloker | 371/46 |
| 4,646,328 A | 2/1987 | Riou | 375/114 |
| 4,646,329 A | 2/1987 | Bojarski | 375/116 |
| 5,151,927 A | 9/1992 | Medlicott | 375/119 |
| 5,229,997 A | 7/1993 | Hirata et al. | 370/104.1 |
| 5,347,548 A | 9/1994 | Messerges et al. | 375/116 |
| 5,487,061 A * | 1/1996 | Bray | 370/252 |
| 5,619,652 A | 4/1997 | Travaglio et al. | 395/200.2 |
| 5,703,882 A | 12/1997 | Jung et al. | 370/474 |
| 5,831,872 A | 11/1998 | Pan et al. | 364/514 R |
| 5,953,318 A * | 9/1999 | Nattkemper et al. | 370/236 |
| 5,963,603 A | 10/1999 | Li et al. | 375/355 |
| 6,058,150 A | 5/2000 | Ghosh | 375/365 |
| 6,275,472 B1 * | 8/2001 | Yamaguchi et al. | 370/252 |
| 6,314,433 B1 | 11/2001 | Mills et al. | 702/202 |
| 6,587,826 B1 * | 7/2003 | Laneman et al. | 704/503 |

* cited by examiner

*Primary Examiner*—Guy J. Lamarre
(74) *Attorney, Agent, or Firm*—Baker Botts L.L.P.

(57) ABSTRACT

A method for selective recovery in a communications environment is provided that includes building a recognizable bit pattern into one or more subframes that are associated with a communication flow. One or more of the subframes may be positioned into a superframe. In cases where one or more errors are present in the superframe, the superframe may be demultiplexed such that one or more of the subframes included in the superframe are analyzed and then discarded or forwarded based on the presence of one or more of the errors.

26 Claims, 3 Drawing Sheets

SYSTEM AND METHOD FOR SELECTIVELY RECOVERING FRAMES IN A COMMUNICATIONS ENVIRONMENT

TECHNICAL FIELD OF THE INVENTION

This invention relates in general to the field of communications and, more particularly, to a system and a method for selectively recovering frames in a communications environment.

BACKGROUND OF THE INVENTION

Communication systems have grown increasingly complex in today's society. One aspect associated with communications relates to errors or noise. High levels of errors or noise may result in traffic loss or significant degradations in the quality of data such that the resulting/surviving data is unusable. Additionally, data traffic that experiences significant noise conditions may require retries, which can expend valuable network resources.

In certain scenarios where traffic is distributed across multiple links, a myriad of additional configuration problems associated with errors or noise may occur. For example, when many smaller packets are multiplexed into a larger one, an error may be generated on a corresponding T1/E1 line. Noise or errors that cause corruption of a single timeslot of a T1 line may result in a single packet being lost in a normal network. When multiplexing is used, the corruption of a single timeslot may cause multiple packets to be lost, thus amplifying packet loss for the communication flow. Thus, a problem exists where an errored frame is encountered and an entire frame segment (often referred to as a 'superframe') is discarded even in cases when some of the included subframes may not have errors.

Such deficiencies may inhibit system performance and force valuable bandwidth to be underutilized or wasted. Operations that accommodate a suitable level of noise at the expense of sacrificing valuable T1/E1 lines are not feasible for service providers. Accordingly, the ability to provide a communications system that consumes few resources, optimizes bandwidth, and addresses error/noise characteristics properly presents a significant challenge for network designers, service providers, and system administrators.

SUMMARY OF THE INVENTION

From the foregoing, it may be appreciated by those skilled in the art that a need has arisen for an improved communications approach that provides the capability for effective treatment of noise or errors associated with one or more communication links. In accordance with one embodiment of the present invention, a system and a method for selectively recovering frames in a communications environment are provided that substantially eliminate or greatly reduce disadvantages and problems associated with conventional communication techniques.

According to one embodiment of the present invention, there is provided a method for selective recovery in a communications environment that includes building a recognizable bit pattern into one or more subframes that are associated with a communication flow. One or more of the subframes may be positioned into a superframe. In cases where one or more errors are present in the superframe, the superframe may be demultiplexed such that one or more of the subframes included in the superframe are analyzed and then discarded or forwarded based on the presence of one or more of the errors.

Certain embodiments of the present invention may provide a number of technical advantages. For example, according to one embodiment of the present invention, a communications approach is provided that allows for the salvaging of non-errored voice packets, errored voice packets, and control packets within an errored multiplexed superframe. Such an operation addresses the deficiency in discarding an entire frame when only a portion of it is unsuitable for its intended purpose. This may further increase overall traffic availability and reduce the liability that comes with packet multiplexing. Moreover, because in the majority of instances only one subframe in a superframe includes an error, more subframes being allowed to propagate through the architecture achieves a reduction in packet loss.

Another technical advantage associated with one embodiment of the present invention also relates to the ability of the architecture to selectively recover frames. Performing such recovery operations may increase bandwidth parameters (e.g. via T1/E1 lines), as fewer retries would need to be executed by a corresponding architecture. Thus, network robustness would be enhanced. In addition, using such a procedure would increase voice and video call quality. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
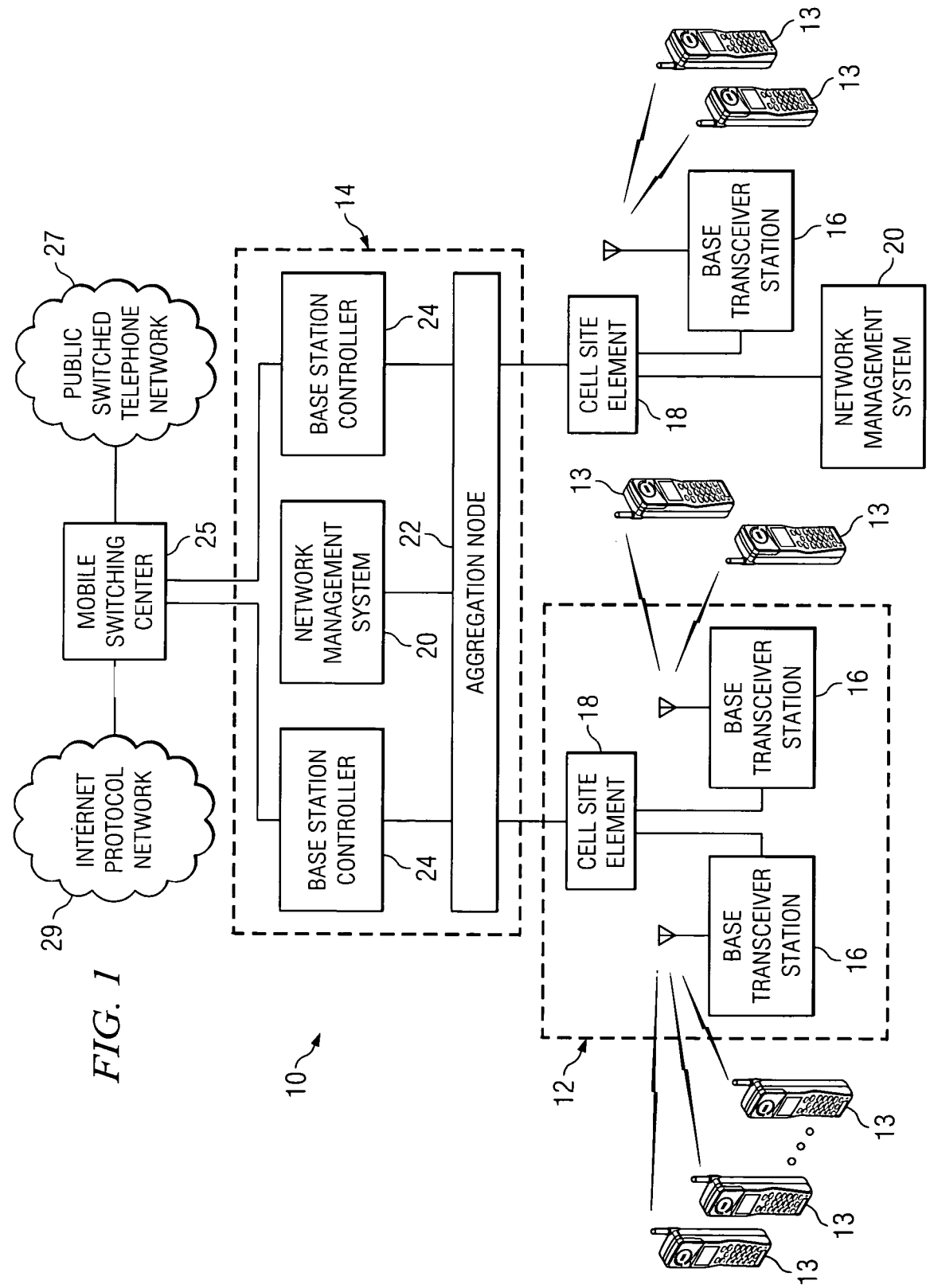
FIG. 1 is a simplified block diagram of a communication system for selectively recovering frames in a communications environment in accordance with one embodiment of the present invention.

FIG. 1 is a simplified block diagram of a communication system 10 for monitoring one or more communication links in accordance with one embodiment of the present invention. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with a first generation or 3G network, where first generation or 3G equivalent networking equipment is provided in the architecture. Communication system 10 is versatile in that it may be used in a host of communication environments such as in conjunction with any time division multiple access (TDMA) element or protocol for example, whereby signals from end users, subscriber units, or mobile stations 13 may be multiplexed over the time domain.

In accordance with the teachings of the present invention, communication system 10 operates to enable the salvaging of non-errored subframes and errored voice/video subframes within a multiplexed superframe by embedding individual cyclic redundancy checks (CRCs) and unique bit patterns in the subframes. On the receiving end, this feature may intercept the multiplexed superframe, which has errors, and parse it to determine how many subframes can be salvaged. The amount salvaged may be based on any suitable user configuration.

Communication system 10 achieves an improvement in bandwidth across the T1/E1 link between cell site element 18 and aggregation node 22, which are described in greater detail below. Packets may be multiplexed by taking a large number of voice, video, or data packets and positioning them into a single packet. In this manner, a significant number of layer-two headers may be discarded, whereby a small header may be placed in the larger packet or superframe and indicates the location of the next multiplexed sub-frame.

The superframe that is created has less bytes than the sum of all of the subframes that would have been transmitted. Generally, if such subframes were not multiplexed and a bit error was present on the line, then a voice, video, or data packet would be lost. In the context of a superframe, the corruption of a single packet would lead to discarding an entire superframe of data.

In network environments, such as ones which require leased T1/E1 lines to transport packets, any compression method that reduces the bandwidth over the leased lines translates into cost savings for a network provider. As a result, a method (e.g. RFC 2508) to compress individual IP packets (to reduce the layer-three and layer-four headers), and multiplex the individual subframe packets into larger superframe packets (to reduce the layer-two headers) may be used (e.g. RFC 3153).

A disadvantage in multiplexing many smaller packets into a larger one arises when the T1/E1 lines are noisy or include some other type of error. Errors may cause corruption of a single timeslot of a T1 line, which may result in a single packet being lost in a normal network. However, when multiplexing is used, the corruption of a single timeslot may cause multiple packets to be lost. This amplifies packet loss to unacceptable limits. One reason for multiplexing operations is to reduce packet header duplication (conserving link bandwidth) and to optimize central processing unit (CPU) cycles. The issue presented by such operations is that a receiving interface may perform a CRC check and, upon encountering an errored superframe, discard the entire superframe even though some of the subframes may not have errors.

Communication system 10 avoids such issues by selectively discarding certain packets of information, while recovering and communicating others. A corrupted voice, video, or data packet can still be forwarded because even a degradation in information quality is preferred to silence (or no data) on the link. Hence, in the example of voice data, corrupted speech is better than no speech at all. Appropriate software or algorithms, as explained more fully below, may be used to recover non-errored subframes, as well as errored voice/video subframes within a multiplexed superframe. This may be achieved by embedding individual CRCs and unique bit patterns in the subframes. On the receiving end, this feature may intercept the multiplexed superframe, which may include errors, and segment it to determine the subframes that can be salvaged for the corresponding communications flow.

Such an operation addresses the waste of discarding an entire frame when only a portion of it is unsuitable for its intended purpose. This may further increase overall traffic availability and reduce the liability that comes with packet multiplexing. Moreover, because in the majority of instances only one subframe in a superframe includes an error, the more subframes being allowed to propagate through the architecture achieves a greater reduction in packet loss. Performing such recovery operations may increase bandwidth parameters (e.g. via T1/E1 lines), as fewer retries would need to be executed by a corresponding architecture. Thus, network robustness would also be enhanced. Implementing such a procedure would also increase voice, video, or data call quality for the associated communications flow.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. As used herein in this document, 'link' refers to any communication wire, cable, fiber, line, conduit, wireless connection, passage, or pathway operable to carry or communicate information or data in any appropriate format. A backhaul connection between cell site element 18 and aggregation node 22 may also include a suitable communication link (e.g. T1/E1 line).

Base station controllers 24 generally operate as management components for a radio interface. This may be done through remote commands to a corresponding base transceiver station (e.g. base transceiver station 16) within a mobile network. One base station controller 24 may manage more than one base transceiver station 16. Some of the responsibilities of base station controllers 24 may include management of radio channels and assisting in handover/handoff scenarios.

In operation, layer-two based traffic may be communicated by each base transceiver station 16 to cell site element 18 of cell site 12. Cell site element 18 may also receive IP or Ethernet traffic from network management system 20. Cell site element 18 may multiplex payloads together from the layer-two based traffic that have a common destination. The multiplexed payloads as well as any payloads extracted from the network management system (e.g. IP or Ethernet traffic) may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controllers 24 and PSTN 27. Mobile switching center 25 may also generally handle connection, tracking, status, billing information, and other user information for communications in a designated area where appropriate.

PSTN 27 represents a worldwide telephone system that is operable to conduct or facilitate communications. PSTN 27 may be any land line telephone network operable to facilitate communications between two entities, such as two persons, a person and a computer, two computers, or in any other environment in which data is exchanged for purposes of communication.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architecture or system that facilitates communications in a network environment. IP network 29 implements a transmission control protocol/internet protocol (TCP/IP) communication language protocol in a particular embodiment of the present invention. However, IP network 29 may alternatively implement any other suitable communications protocol (e.g. frame relay, X.25, asynchronous transfer mode (ATM), etc.) for transmitting and receiving data packets within communication system 10.

Figure 2:
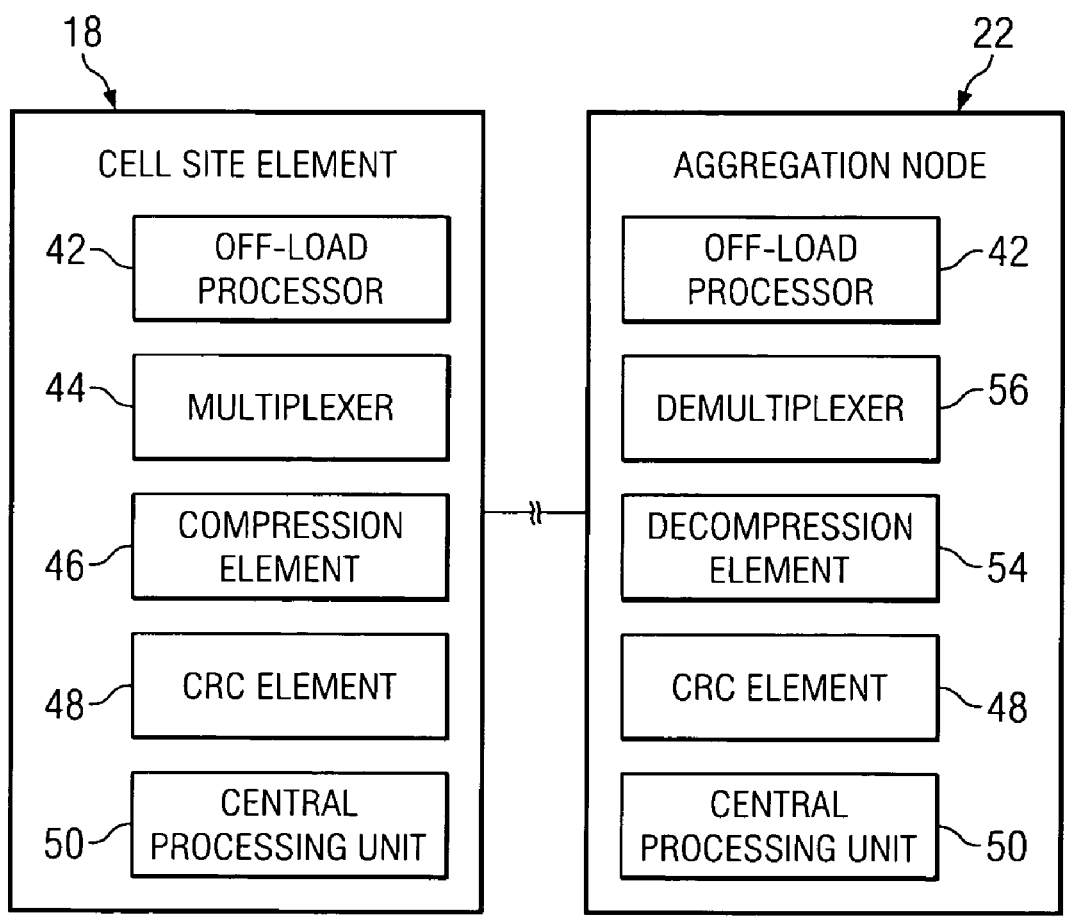
FIG. 2 is a simplified block diagram of a cell site element and an aggregation node that may be included within the communication system.

FIG. 2 is a simplified block diagram of cell site element 18 and aggregation node 22, both of which may be included within communication system 10. Cell site element 18 and aggregation node 22 may each include an off-load processor 42, a CRC element 48, and a central processing unit (CPU) 50. Additionally, cell site element 18 may include a multiplexer 44 and a compression element 46. Aggregation node 22 may include a demultiplexer 56 and a decompression element 54.

Aggregation node 22 and cell site element 18 are network elements that may share one or more of the same functionalities and/or capabilities. For purposes of example and teaching only, one part of the selective recovery of frames feature is described as being positioned in cell site element 18 and the other part in aggregation node 22. These two elements may cooperate in order to achieve the teachings of communication system 10. Alternatively, such capabilities may be provided in any other suitable location of communication system 10 or provided separately as their own distinct structure, device, component, module, element, or object. It is also critical to note that the use of the terms 'aggregation node' and 'cell site element' herein in this document only connotes an example representation of one or more elements associated with base transceiver station 16 and base station controller 24. These terms have been chosen arbitrarily and offered for purposes of teaching only and, therefore, do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, loadbalancers, interfaces, or any other suitable module, device, component, element or object operable to effectuate one or more of the operations, tasks, or functionalities associated with recovering data or information as implied, described, provided, or offered herein.

Cell site element 18 and aggregation node 22 may be capable of salvaging errored frames propagating in communication system 10. Such errors may relate to noise, line code violations, path code violations, bi-polar violations, or excessive zeros that occur. Alternatively, cell site element 18 and aggregation node 22 may identify any other suitable errors or noise parameters in accordance with particular needs.

In operation of an example embodiment, when a call is initiated a number of control packets may be sent and used to set up the call (i.e. allocating a cell tower, identifying signal strength, setting up power levels, etc.) and ensure that a proper platform exists that may allow the call to occur. Subsequent to this, voice packets may begin being transmitted (e.g. 1/20 ms) for the call. The voice packet is generally small and the voice data payload is generally under twenty bytes. In some cases, the layer-two or layer-three headers actually occupy more space than the data payload. The voice packets may be compressed (e.g. using cUDP (RFC 2508)) by compression element 46, which removes the UDP and IP header. The packets may also be multiplexed by multiplexer 44 in order to remove the layer-two header.

The multiplexed packets may be positioned into a single superframe. This may be executed using a PPP multiplex protocol (e.g. RFC 3153). The larger multiplexed superframe may be received by aggregation node 22, which may use demultiplexer 56 to demultiplex and decompress (using decompression element 54) the incoming superframe. Thus, the data is restored to reflect an IP packet that was originally communicated to cell site element 18. The IP packet being transmitted from aggregation node 22 may then be communicated to an Ethernet interface. However, the Ethernet interface does not present a cost issue for such transmissions. Instead, a significant cost is incurred by the backhaul T1/E1 links. Bandwidth optimization is generally significant on the backhaul, but may be considered negligible for the Ethernet interface in this example.

Off-load processor 42 may perform a number of tasks at an accelerated rate where appropriate. A polynomial or sum CRC operation (i.e. a check, calculation, or verification) may be performed by CRC element 48 in order to selectively discard frames to minimize the data that is lost. The goal of this element (which may include a suitable algorithm, software, or hardware) is to selectively salvage or discard individual subframes within the already identified errored superframe based on error status, type and content, or any other suitable parameter. Alternatively, such a functionality may be provided by an ASIC, or by any other suitable device, component, element, or object where appropriate and based on particular needs. This method may build a four-bit CRC error check and four-bit recognizable bit pattern into each subframe to enable error detection at all levels of the superframe. The logic of this operation is as follows. Note that the recognizable pattern may be used in the case where bit errors have corrupted the length field of a subframe. In such a case, the recognizable bit pattern could be used to "sync up" to the next recognizable subframe. This scenario is generally more likely in a noise spike or in a non-trickling bit error condition.

Upon receipt of the multiplexed superframe, a receiving interface (e.g. a serial driver) performs a CRC calculation. This could also be one of several hardware errors, such as CRC, flag status change, or RX hunt, that the serial controller reports in addition to the HDLC CRC. If there are no errors, the superframe may be forwarded for demultiplexing. If errored, the superframe may be intercepted and, instead of being discarded, it may be partially demultiplexed. The individual subframes may be analyzed, whereby a CRC calculation is performed for errors. Demultiplexer 56 may analyze errored and non-errored packets the same. The receive routine may determine whether to forward the errored packet rather than discard it.

Instead of simply discarding the errored frame, the receive routine may inspect the layer-two header and find that it is indeed a multiplexed superframe (e.g. provided by a correct protocol ID), and if so it may then forward the packet to the demultiplexing routine. Non-errored subframes may be sent to CPU element 48 for general processing. Errored subframes may be analyzed and a decision may be made to forward or discard based on DSCP (Diff Serv Code Point) values in an example embodiment or other parameter, which may be based on particular configuration arrangements or specific architecture needs. If voice frames are errored, they may be forwarded. The sentiment is that forwarding errored voice packets is acceptable since the perceived quality resulting from those errors is somewhat subjective. Errored control packets may be detected by their DSCP values and discarded because of their uselessness.

These tasks may be configurable through a number of sources: for example through the command line interface (CLI) to modularize the decision making of matching DSCP values to keep or discard frames based on how the subframe DSCP values are being set. The scope of this operation is not only relegated to a point to point protocol (PPP) multiplexing environment but also other encapsulations in which multiple subframes are multiplexed into a larger superframe. In PPP however, a link control protocol (LCP) renegotiation may be used for feature robustness.

Figure 3:
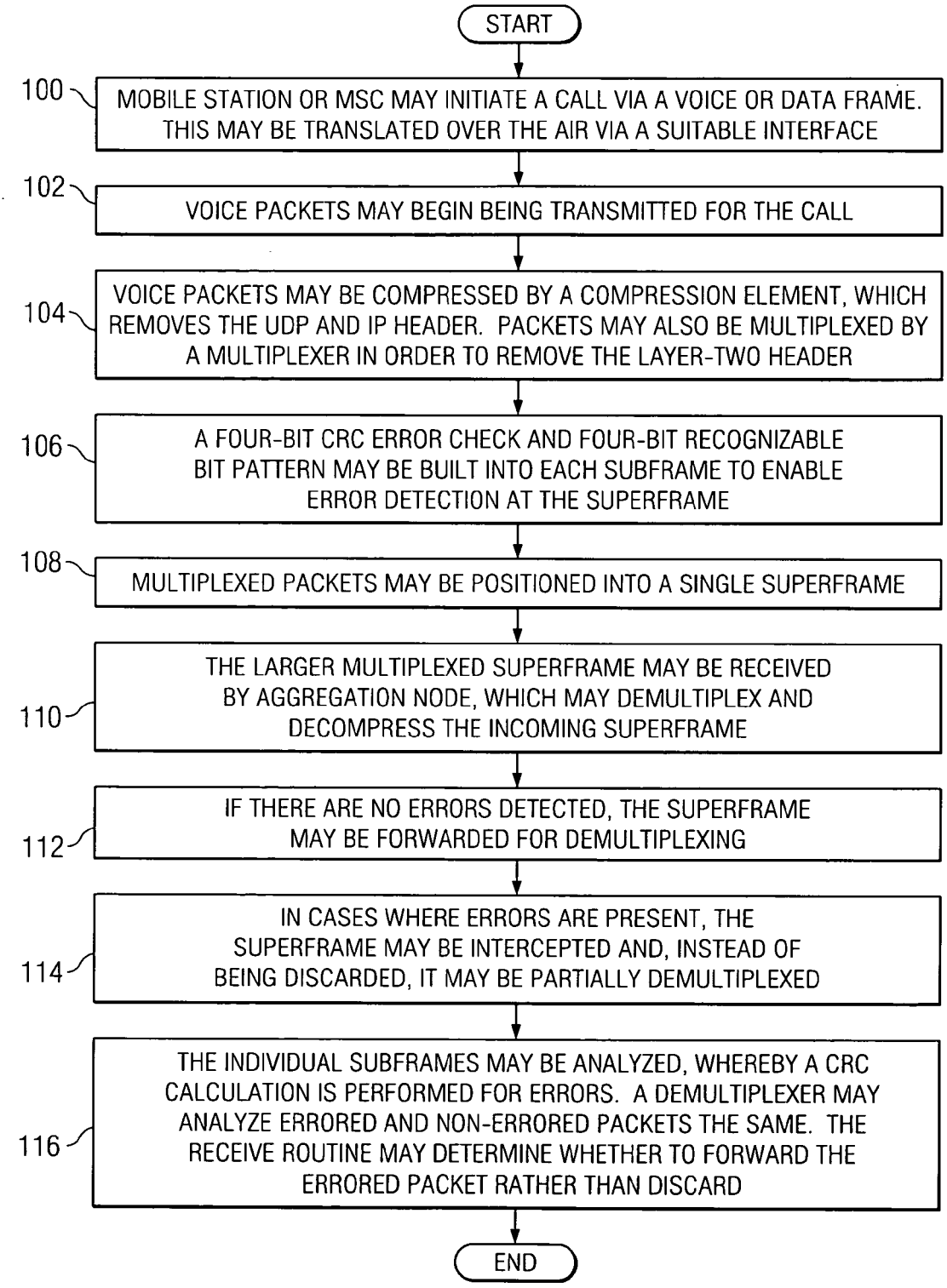
FIG. 3 is a flowchart illustrating a series of example steps associated with a method for selectively recovering frames in the communication system.

FIG. 3 is a simplified flowchart illustrating a series of example steps associated with selectively recovering frames in a communications environment. The method may begin at step 100, where mobile station 13 or MSC 25 may initiate a call via a voice or data frame. In this example embodiment, a voice call is described. This may be translated over the air via a suitable interface. This voice frame, which may be part of an initiated communication session, may be received at base transceiver station 16. Thus, when a call is initiated a number of control packets are sent and used to set up the call and ensuring that a proper platform exists to conduct the call.

Subsequent to this, voice packets may begin being transmitted (e.g. 1/20 ms) for the call at step 102. At step 104, the voice packets may be compressed by compression element 46, which removes the UDP and IP header. The packets may also be multiplexed by multiplexer 44 during this step in order to remove the layer-two header.

At step 106, a four-bit CRC error check and four-bit recognizable bit pattern may be built into each subframe to enable error detection at all levels of the superframe. At step 108, the multiplexed packets may be positioned into a single superframe. This may be executed using a PPP multiplex protocol. The larger multiplexed superframe may be received by aggregation node 22, which may use demultiplexer 56 to demultiplex and decompress the incoming superframe at step 100.

At aggregation node 22, a polynomial or sum CRC operation may be performed by CRC element 48 in order to selectively discard frames to minimize the data that is lost. The objective is to selectively salvage or discard individual subframes within the already identified errored superframe based on error status, type, and content for example. Upon receipt of the multiplexed superframe, a receiving interface (e.g. a serial driver) may perform a CRC calculation. If there are no errors, the superframe may be forwarded for demultiplexing at step 112. In cases where errors are present, the superframe may be intercepted and, instead of being discarded, it may be partially demultiplexed at step 114.

The individual subframes may be analyzed, whereby a CRC calculation is performed for errors. Demultiplexer 56 may analyze errored and non-errored packets the same. The receive routine may determine whether to forward the errored packet rather than discard it at step 116. Instead of simply discarding the errored frame, the receive routine may inspect the layer-two header and find that it is indeed a multiplexed superframe (e.g. via a correct protocol ID), and if so, it may then forward the packet to the demultiplexing routine. Non-errored subframes may be sent to CPU element 48 for general processing. Errored subframes may be analyzed and a decision may be made to forward or discard based on any suitable value or parameter. If voice frames are errored, they may be forwarded. Errored control packets may be detected by their targeted (e.g. DSCP) values and discarded based on their usefulness.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal components.

In addition, although the preceding description offers a protocol to be implemented with particular devices (e.g. aggregation node 22 and cell site element 18), the protocol provided may be embodied in a fabricated module that is designed specifically for effectuating the techniques as provided above. Moreover, such a module may be compatible with any appropriate architecture other than the described platforms, which were offered for purposes of teaching and example only.

Additionally, although numerous example embodiments provided above reference voice data, communication system 10 may cooperate with any other type of data in which compression protocols are applicable. For example, normative or standard data, video data, and audio-visual data may benefit from the teachings of the present invention. Communication system 10 provides considerable adaptability in that it may be used in conjunction with any information that is sought to be compressed in a communications environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for selective recovery of data in a communications environment, comprising:
   a cell site element operable to build a recognizable bit pattern into one or more of subframes associated with a communication flow, wherein one or more of the subframes may be positioned into a superframe, and wherein in cases where one or more errors are present in the superframe, the superframe may be demultiplexed such that one or more of the subframes included in the superframe are analyzed and then discarded or forwarded based on a presence of one or more of the errors.

2. The apparatus of claim 1, further comprising:
   an aggregation node operable to receive the superframe and to perform the discarding and forwarding operations for the superframe.

3. The apparatus of claim 2, wherein a cyclic redundancy check (CRC) segment is built into the subframes that are positioned in the superframe, and wherein a CRC operation may be performed by the aggregation node.

4. The apparatus of claim 2, wherein the aggregation node is further operable to decompress the superframe after it is received.

5. The apparatus of claim 1, wherein the cell site element is further operable to compress information associated with the communication flow before the information is sent to a next destination.

6. The apparatus of claim 1, wherein if the superframe does not contain one or more of the errors then it is forwarded for demultiplexing.

7. An apparatus for selective recovery of data in a communications environment, comprising:
   an aggregation node operable to receive a superframe that includes plurality of subframes associated with a communication flow, wherein a recognizable bit pattern is built into one or more of the subframes, and wherein in cases where one or more errors are present in the superframe, the superframe may be demultiplexed such that one or more of the subframes included in the superframe are analyzed and then discarded or forwarded based on a presence of one or more of the errors.

8. The apparatus of claim 7, further comprising:
   a cell site element operable to build the superframe using the one or more subframes.

9. The apparatus of claim 7, wherein a cyclic redundancy check (CRC) segment is built into the subframes that are included in the superframe, and wherein a CRC operation may be performed by the aggregation node.

10. The apparatus of claim 7, wherein the aggregation node is further operable to decompress the superframe before it is sent to a next destination.

11. The apparatus of claim 7, wherein if the superframe does not contain one or more of the errors then the superframe is forwarded for demultiplexing.

12. A method for selective recovery of data in a communications environment, comprising:
   building a recognizable bit pattern into one or more subframes that are associated with a communication flow; and positioning one or more of the subframes into a superframe, wherein in cases where one or more errors are present in the superframe, the superframe may be demultiplexed such that one or more of the subframes included in the superframe are analyzed and then discarded or forwarded based on the presence of one or more of the errors.

13. The method of claim 12, further comprising:
building a cyclic redundancy check (CRC) segment into the subframes that are included in the superframe.

14. The method of claim 12, further comprising:
decompressing the superframe before the superframe is sent to a next destination.

15. The method of claim 12, further comprising:
compressing information associated with the communication flow before the information is sent to a next destination.

16. The method of claim 12, further comprising:
performing a CRC operation after the superframe is received.

17. A system for selective recovery of data in a communications environment, comprising:
means for building a recognizable bit pattern into one or more subframes that are associated with a communication flow; and
means for positioning one or more of the subframes into a superframe, wherein in cases where one or more errors are present in the superframe, the superframe may be demultiplexed such that one or more of the subframes included in the superframe are analyzed and then discarded or forwarded based on the presence of one or more of the errors.

18. The system of claim 17, further comprising:
means for building a cyclic redundancy check (CRC) segment into the subframes that are included in the superframe.

19. The system of claim 17, further comprising:
means for decompressing the superframe before the superframe is sent to a next destination.

20. The system of claim 17, further comprising:
means for compressing information associated with the communication flow before the information is sent to a next destination.

21. The system of claim 17, further comprising:
means for performing a CRC operation after the superframe is received.

22. A computer readable medium having therein software for selective recovery of data in a communications environment, said software comprising computer code such that when executed is operable to:
build a recognizable bit pattern into one or more subframes that are associated with a communication flow; and
position one or more of the subframes into a superframe, wherein in cases where one or more errors are present in the superframe, the superframe may be demultiplexed such that one or more of the subframes included in the superframe are analyzed and then discarded or forwarded based on the presence of one or more of the errors.

23. The medium of claim 22, wherein the code is further operable to:
build a cyclic redundancy check (CRC) segment into the subframes that are included in the superframe.

24. The medium of claim 22, wherein the code is further operable to:
decompress the superframe before the superframe is sent to a next destination.

25. The medium of claim 22, wherein the code is further operable to:
compress information associated with the communication flow before the information is sent to a next destination.

26. The medium of claim 22, wherein the code is further operable to:
perform a CRC operation after the superframe is received.

* * * * *